(12) United States Patent
Flanigan

(10) Patent No.: US 9,540,512 B2
(45) Date of Patent: *Jan. 10, 2017

(54) LOW TEMPERATURE PREPARATION OF RUBBER-MODIFIED ASPHALT CEMENT

(71) Applicant: Wright Asphalt Products Company, Houston, TX (US)

(72) Inventor: Theodore P Flanigan, League City, TX (US)

(73) Assignee: Wright Asphalt Products Company, Houston, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/598,965

(22) Filed: Jan. 16, 2015

(65) Prior Publication Data

US 2015/0133587 A1    May 14, 2015

Related U.S. Application Data

(63) Continuation of application No. 14/036,956, filed on Sep. 25, 2013, now Pat. No. 8,969,442, which is a continuation of application No. 13/493,557, filed on Jun. 11, 2012, now Pat. No. 8,664,304, which is a continuation of application No. 12/733,706, filed as application No. PCT/US2009/005295 on Sep. 24, 2009, now Pat. No. 8,202,923.

(60) Provisional application No. 61/136,677, filed on Sep. 24, 2008.

(51) Int. Cl.

| C08L 95/00 | (2006.01) |
|---|---|
| C08J 3/00 | (2006.01) |
| C08L 21/00 | (2006.01) |
| C09D 195/00 | (2006.01) |
| B28C 7/00 | (2006.01) |
| C08L 19/00 | (2006.01) |

(52) U.S. Cl.
CPC ............... C08L 95/00 (2013.01); B28C 7/003 (2013.01); C08J 3/005 (2013.01); C08L 21/00 (2013.01); C09D 195/00 (2013.01); *C08J 2395/00* (2013.01); *C08L 19/003* (2013.01); *C08L 2555/22* (2013.01); *C08L 2555/34* (2013.01); *C08L 2555/86* (2013.01)

(58) Field of Classification Search
CPC ....................................................... C08L 95/00
See application file for complete search history.

(56) References Cited

U.S. PATENT DOCUMENTS

| 4,485,201 | A | | 11/1984 | Davis | |
|---|---|---|---|---|---|
| 5,492,561 | A | * | 2/1996 | Flanigan | C08L 19/003 106/273.1 |
| 5,496,400 | A | | 3/1996 | Doyle et al. | |
| 5,501,730 | A | | 3/1996 | Duong et al. | |
| 5,904,760 | A | * | 5/1999 | Hayner | C08L 95/00 106/279 |
| 5,929,144 | A | | 7/1999 | Fields | |
| 7,087,665 | B2 | | 8/2006 | Sylvester et al. | |
| 2005/0131113 | A1 | | 6/2005 | Sylvester | |
| 2005/0203197 | A1 | | 9/2005 | Tang | |
| 2006/0249049 | A1 | | 11/2006 | Martin | |
| 2007/0249762 | A1 | | 10/2007 | Sylvester | |
| 2008/0015287 | A1 | | 1/2008 | Butler et al. | |

FOREIGN PATENT DOCUMENTS

| WO | WO 94/14896 | 7/1994 |
|---|---|---|
| WO | WO 99/27018 | 6/1999 |
| WO | WO 2004/020528 | 3/2005 |

OTHER PUBLICATIONS

Extended European Supplementary Search Report dated Mar. 22, 2013 for European Application No. 09816576.4-1306.
International Search Report dated Nov. 13, 2009 for PCT/US2009/005295.

* cited by examiner

*Primary Examiner* — Randy Gulakowski
*Assistant Examiner* — Christopher M Rodd
(74) *Attorney, Agent, or Firm* — Jones Day

(57) ABSTRACT

This invention encompasses systems, methods, and apparatuses for low temperature preparation of rubber modified asphalt cement as well as resulting compositions.

13 Claims, 1 Drawing Sheet

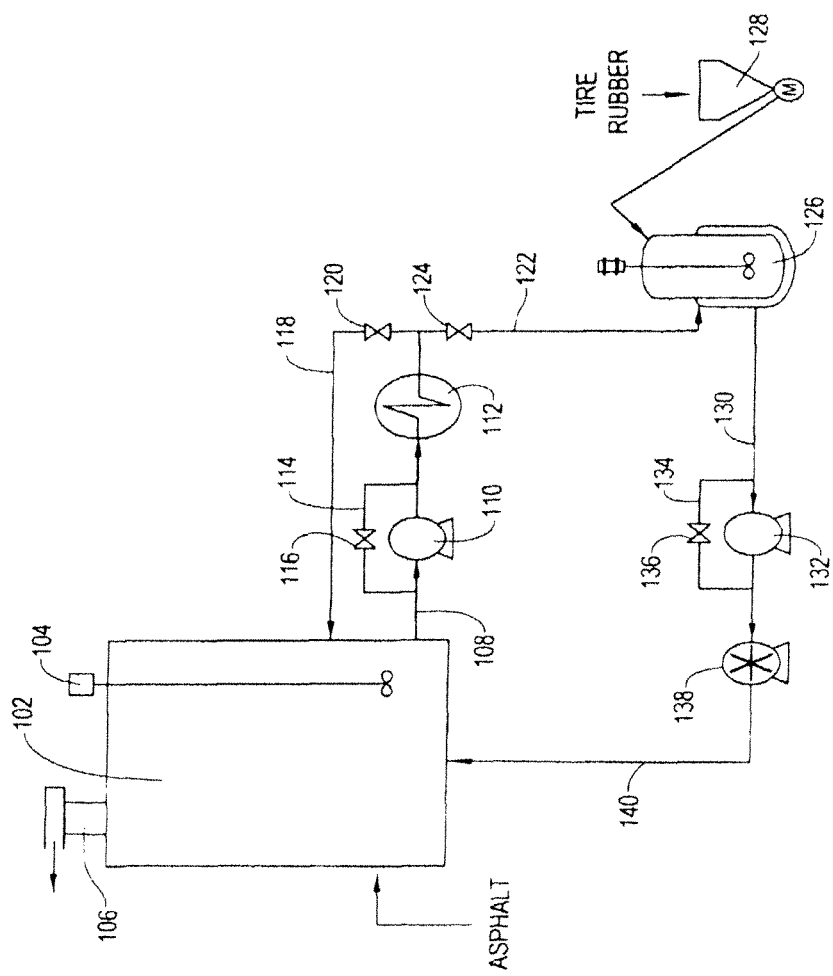

LOW TEMPERATURE PREPARATION OF RUBBER-MODIFIED ASPHALT CEMENT

CROSS REFERENCE TO RELATED APPLICATIONS

This application is a continuation of U.S. patent application Ser. No. 14/036,956, filed Sep. 25, 2013, which is a continuation of U.S. patent application Ser. No. 13/493,557, filed Jun. 11, 2012, now U.S. Pat. No. 8,664,304, which is further a continuation of U.S. patent application Ser. No. 12/733,706, filed Mar. 16, 2010, now U.S. Pat. No. 8,202,923, which is the National Stage of International Application No. PCT/US2009/005295, filed Sep. 24, 2009, which designated the United States and published in English, and which further claims the benefit of priority from U.S. Provisional Application No. 61/136,677, filed Sep. 24, 2008. Priority to each of the foregoing applications is expressly claimed, and the disclosures of each of the respective foregoing applications are hereby incorporated by reference in their entireties for all purposes.

FIELD OF THE INVENTION

This invention relates to a rubber-modified asphalt cement, and to systems, apparatuses, and methods for preparing a rubber-modified asphalt cement.

BACKGROUND OF THE INVENTION

Several attempts have been made to produce rubber-modified asphalt cements having the highly desirable properties of stability and prolonged high-level resistance to water-, fuel-, and ultraviolet (UV) light-associated degradation.

Specifically, for example, U.S. Pat. No. 5,397,818, U.S. Pat. No. 5,492,561 (Flanigan I) and U.S. Pat. No. 5,583,168 (Flanigan II) describe processes for liquefying rubber granules in a TRMACS process, by heating crumb rubber and asphalt to temperatures of approximately 500° F. using spray jets or spray bombardment.

Although several achievements have been made in producing asphalt cements having desirable properties, a need still remain for improved rubber-modified asphalt cement that possess superior stability and shielding properties, and for systems, apparatuses, and methods for high throughput production of such rubber-modified asphalt cements.

The present invention provides such an improved asphalt cement, as well as systems and methods for preparing and using such a rubber-modified asphalt cement.

BRIEF SUMMARY OF THE INVENTION

In one aspect, the present invention relates to a method for preparing a rubber-modified asphalt cement composition, comprising: contacting asphalt with rubber granules to form a mixture; heating the mixture; and passing the heated mixture through at least one high shear mixer; wherein the rubber-modified asphalt cement composition comprises an integration value of at least 90. In another aspect, the present invention relates to a method for preparing a rubber-modified asphalt cement composition, comprising: contacting asphalt with rubber granules to form a mixture; heating the mixture to a temperature of at least about 500° F.; and passing the heated mixture through at least one high shear mixer for greater than 30 minutes.

In another aspect, the present invention relates to a method for high throughput preparation of a rubber-modified asphalt cement composition, comprising: contacting asphalt with at least 40,000 pounds of rubber granules to form a mixture; heating the mixture; and passing the heated mixture through at least one high shear mixer; wherein the rubber-modified asphalt cement composition comprises an integration value of at least 90, and wherein the method is performed in less than 24 hours.

In another aspect, the present invention relates to a rubber-modified asphalt cement composition prepared by: contacting asphalt with rubber granules to form a mixture; heating the mixture; and passing the heated mixture through at least one high shear mixer; wherein the rubber-modified asphalt cement composition comprises an integration value of at least 90.

In another aspect, the present invention relates to a system for preparing a rubber-modified asphalt cement composition, comprising: an asphalt charging device for charging asphalt into the system; a rubber charging device for charging rubber granules into the system; at least one heater for heating the charged asphalt, the charged rubber granules, or a mixture thereof; at least one high shear mixer for mixing the charged asphalt and charged rubber granules into a rubber-modified asphalt cement composition; and a controller for controlling the asphalt charging device, the rubber charging device, and/or the at least one high shear mixer, in a manner such that the rubber-modified asphalt cement composition has an integration factor of at least 90.

Several embodiments of the invention, including the above aspects of the invention, are described in further detail as follows. Generally, each of these embodiments can be used in various and specific combinations, and with other aspects and embodiments unless otherwise stated herein.

BRIEF DESCRIPTION OF THE DRAWING

FIG. 1 illustrates an apparatus useful for preparing rubber-modified asphalt cement.

DETAILED DESCRIPTION OF THE INVENTION

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing form this or any related application.

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

The term "asphalt" is used herein to mean any suitable naturally-occurring asphalt or asphalt cement, synthetically manufactured asphalt or asphalt cement, such as any asphalt that is a by-product of a petroleum refining process, blown asphalt, blended asphalt, residual asphalt, aged asphalt, petroleum asphalt, straight-run asphalt, thermal asphalt, paving grade-asphalt, performance graded asphalt cement, asphalt flux, bitumen, or the like. Suitable performance graded asphalt cements include, for example, any asphalt cements having the following characteristics set forth in ASTM D6373-99, the contents of which are incorporated herein by reference:

|  | PG64-22 Asphalt Cement | PG58-28 Asphalt Cement |
|---|---|---|
| Average 7-day max Pavement Design Temp, ° C. | <58 | <64 |
| Min. Pavement Design Temp, ° C. | >−28 | >−22 |
| Original Binder | | |
| Flash Point Temp., D 92; min ° C. | 230 | 230 |
| Viscosity, D4402: max. 3 Pa · s Test Temp., ° C. | 135 | 135 |
| Dynamic Shear, P 246: G°/sinδ, min. 1.00 kPa 25 mm Plate, 1 mm Gap Test Temp. at 10 rad/s, ° C. | 58 | 64 |
| Rolling Thin Film Over (Test Method D 2872) | | |
| Mass Loss, max. percent | 1.00 | 1.00 |
| Dynamic Shear, P 246: G°/sinδ, min. 2.20 kPa 25 mm Plate, 1 mm Gap Test Temp. at 10 rad/s, ° C. | 58 | 64 |
| Pressure Aging Vessel Residue (AASHTO PP1) | | |
| PAV Aging Temperature, ° C. | 100 | 100 |
| Dynamic Shear, P 246: G°/sinδ, min. 5000 kPa 8 mm Plate, 2 mm Gap Test Temp. at 10 rad/s, ° C. | 19 | 25 |
| Creep Stiffness, P 245: S, max 300 MPa, m-value; min. 0.300 Test Temp at 60 s, ° C. | −18 | −12 |
| Direct Tension, P 252: Failure Strain, min. 1.0% Test Temp. at 1.0 mm/min, ° C. | −18 | −12 |

Suitable asphalts also include, for example, any asphalt cements having the following characteristics:

|  | AC-20 | AC-5 | Asphalt cement flux | ASTM # |
|---|---|---|---|---|
| Orig. visc. at 140° F. in poise | 1725 | 568 | 40 | ASTM D2171 |
| Penetration at 77° F. 100 g. 5 sec. dmm | 57 | 153 | 300+ | ASTM D5 |
| Softening point ° F. | 118 | 104 | 65 | ASTM D36 |
| Flash point ° F. (COC) | 585 | 588 | 565 | ASTM D92 |
| Ductility at 39.2° F. 5 cm/min. cm | 0 | 5.5 | 15 | ASTM D113 |

The term "rubber," as used herein, refers to any material made substantially of rubber, such as, for example, virgin rubber, recycled rubber (such as from tires, inner-tubes, gaskets, rubber scrap, or the like), peel rubber, cured rubber, and/or processed rubber of any polymer type(s), such as, for example, tire rubber (e.g., scrap tire rubber, whole tire solid rubber, and/or scrap whole tire rubber), non-solvent-treated rubber, non-pre-swelled rubber, and/or any rubber that comprises less than about 5% (such as less than about 3% or even 1%) of talc powder, such as wherein the rubber has no insoluble materials such as metals, fibers, cords, wood, rocks, dirt, and/or the like.

The term "granules," as used herein, refers to any suitable form of rubber for use in preparing a rubber-modified asphalt cement, such as particles, crumbs, and/or other particulate forms (e.g., shavings, fines, beads, or the like), which can be produced and/or processed in any manner (such as via vulcanization, ambient grinding and/or cryogenic grinding). Moreover, granules can exist in suitable size prior to formation of the rubber-modified asphalt cement, such that, for example, greater than about 90 wt. % (such as greater than about 95 wt. %, or even greater than about 99%) of the rubber granules, relative to the total weight of the rubber granules, have a size of less than about 20 mesh (such as less than about 25 mesh, less than about 30 mesh, less than about 35 mesh, less than about 40 mesh, less than about 45 mesh, less than about 50 mesh, less than about 60 mesh, less than about 70 mesh, or even less than about 80 mesh) in accordance with U.S. Sieve series.

The term "integration" or "integration value" as used herein, refers to the weight percent solubility of rubber-modified asphalt cement in trichloroethylene, as determined via Standard Test Method for Solubility of Asphalt Materials in TCE—ASTM D2042. If, for example, a rubber-modified asphalt cement has a solubility in trichloroethylene of 98 wt. %, then about 2 wt. % of the total rubber introduced into the asphalt cement for integration has not successfully integrated into the rubber modified asphalt cement. The terms "fully integrated" and "fully incorporated," as used herein, refer to a rubber-modified asphalt cement composition having an integration value of at least 90 (such as at least 93, at least 95, at least 96, at least about 97, at least about 98, at least about 98.2, at least about 98.4, at least about 98.6, at least about 98.8, at least about 99, at least about 99.2, at least about 99.4, at least about 99.6, or even at least 99.8).

Preparation of Rubber-Modified Asphalt Cement

A rubber-modified asphalt cement (RMAC) having superior properties can be prepared in any suitable manner by mixing, blending, combining, and/or contacting asphalt and rubber granules using a system or method that comprises at least one high shear mixer or mill, under suitable conditions (e.g., a mixture temperature maintained at greater than about 500° F.) and for a suitable duration to cause at least some (e.g., a substantial amount or even all)) of the rubber granules to be liquefied or otherwise subsumed, incorporated, and/or integrated into the asphalt base or medium without any significant and/or substantial degradation and/or destruction of the base asphalt occurring. In another embodiment, for example, the rubber granules and asphalt are mixed without air blowing, jet spray agitation, oxidation, and/or or substantial distillation of the asphalt component. In some embodiments, a high throughput system and method are provided for fast, efficient, reduced cost production of fully integrated rubber-modified asphalt cement.

In some embodiments, as illustrated in FIG. 1, asphalt is charged into process vessel 102 having mixer 104 and is circulated through heat exchanger 112 through line 108 via operation of process feed pump 110. The process vessel 102 preferably has atop exit 106 for removal of excess gaseous hydrocarbons and other gaseous vapors, such as H$_2$S, which are disposed of, for example, by incineration at a temperature of about 1350° F. A portion or all of the asphalt can be recirculated through process feed pump 110 via line 114 having valve 116, such as to control, adjust, and/or regulate the flow pressure of the asphalt at downstream components of the system or apparatus (e.g., heat exchanger 112 and pre-wet vessel 126).

Following passage through heat exchanger 112, some or all of the asphalt can be routed back to process vessel 102 through line 118 having valve 120, such as, to maintain the temperature of, or further heat, the asphalt (or asphalt/rubber mixture during later production stages). The asphalt, in this manner, can be heated and maintained at any suitable temperature (such as about 450-550° F., about 460-540° F., about 480-520° F., about 490-510° F., e.g., at least about 460° F., at least about 480° F., at least about 490° F., at least about 500° F., or at least about 510° F.) via circulation through heat exchanger 112, prior to being passed through the remainder of the system.

All or some of the heated asphalt is then passed through line 122 (having valve) 24) to pre-wet vessel 126 for mixing with rubber granules. Rubber granules, in turn, are charged into the pre-wet vessel 126 via auger 128. The asphalt and rubber granules come into contact in pre-wet vessel 126, to form a wetted asphalt/rubber mixture. Such wetting of the rubber granules within pre-wet vessel 126 can occur in any manner. In one embodiment, the rubber granules are top loaded into pre-wet vessel 126, and atop mounted mixer within pre-wet vessel 126 causes the asphalt base and rubber granules to intermix. The pre-wet vessel, in this regard, can be of any suitable size (e.g., a 1500+ gallon capacity, or even a 2500+ gallon capacity), and the rubber granules can be charged into the pre-wet vessel at any desired rate (e.g., at least 1500 pounds/hour, at least 2000 pounds/hour, at least 2500 pounds/hour, or even at least 3000 pounds/hour).

The wetted asphalt/rubber mixture is pulled from pre-wet vessel 126 by process return pump 132 through line 130 and towards high shear mill 138. A portion or all of the asphalt/rubber mixture can be recirculated through process return pump 132 via line 134 having valve 136, if desired, in order to control, adjust, and/or regulate the flow pressure of the wetted asphalt/rubber mixture at downstream components of the system or apparatus (e.g., high shear mill 138).

In some embodiments, the operation of process return pump 132 and process feed pump 110 is synchronized in order to maintain constant liquid levels within pre-wet vessel 126.

The wetted asphalt/rubber mixture then enters high shear mixer 138, wherein the mixture is subjected to (or encounters) high shear mixing that at least partially integrates and/or incorporates the rubber granules into the asphalt base (thus forming a sheared, heated mixture and/or an at least partially integrated rubber-modified asphalt cement composition). The high shear mixer used in the context of the present invention can be any suitable mixer or mill (e.g., colloid mill) capable of high shear mixing (and/or imparting mechanical shearing on) the asphalt and rubber granules components. Suitable such high shear mixers include, for example, any high shear mixers comprising paddles or fluid rotors, such as any Siefer high shear mixer (e.g., a Seifer SMD3 300 HP high shear mixer) or Silversen high shear mixer (e.g., Silversen descending head shear mixer), or any other suitable high shear mixer. The high shear mixer can comprise any suitable mill gap set, such as, for example, a mill gap set of about 0.00001-1.0 inches (such as about 0.00005-0.5 inches, about 0.0001-0.1 inches, about 0.0005-0.05 inches, about 0.0005-0.01 inches, or even about 0.001-0.0075 inches).

Following passage through high shear mill 138, the at least partially integrated asphalt/rubber mixture circulates or passes back to process vessel 102 through line 140, from where the mixture can be circulate again through the system. In this manner, circulation of the heated mixture through the system is continued, with the temperature of the mixture being maintained at the desired temperature (such as about 450-550° F., about 460-540° F., about 480-520° F., about 490-510° F., e.g., at least about 460° F., at least about 480° F., at least about 490° F., at least about 500° F., or at least about 510° F.), until the desired degree of integration of the rubber granules into the asphalt medium is achieved. Once a rubber-modified asphalt cement composition having the desired integration factor is achieved, the composition is pumped out of the system into a holding vessel before being blended, oxidized, polymer modified, or shipped as is.

In operation, the asphalt component is charged to the system, is heated, and is contacted with the rubber granules component as the granules are charged to the system. The mixture of asphalt and rubber granules can be passed (and concurrently heated and/or maintained at a desired temperature) through all or some of the system during the time required to charge all desired asphalt and rubber components into the system. In some embodiments, some or all of the asphalt component is heated (such as a temperature of at least 500° F.) prior to being contacted with the rubber granules component. Following charging of all asphalt and rubber granules into the system, the heated mixture of asphalt and rubber granules components can be passed (or continued to be passed) through the high shear mixer(s) for at least 30 minutes, as measured from the time point at which all asphalt and rubber granules components have been charged to the system and/or heated to the desired temperature. In this regard, the asphalt and rubber granules are continued to be mixed through the system or method until the desired integration factor is achieved.

Any suitable duration of high shear mixing can be utilized in the present invention, depending on the desired finished properties of the rubber-modified asphalt cement. In some embodiments, once the asphalt and rubber components are contacted within the system, the mixture of asphalt and rubber is heated (such as to a temperature of at least about 500° F.), and the heated mixture is passed and/or circulated through at least one high shear mixer for greater than 30 minutes, greater than 45 minutes, greater than 60 minutes, greater than 75 minutes, greater than 90 minutes, greater than 115 minutes, or even greater than 130 minutes, as measured from the time point at which all asphalt and rubber granules components have been charged to the system and/or heated to the desired temperature. In some embodiments, a fully integrated rubber-modified asphalt cement composition is prepared by passing and/or circulating a heated mixture of rubber and asphalt through at least one high shear mill for less than 240 minutes, such as less than 200 minutes, less than 180 minutes, less than 160 minutes, less than 140 minutes, less than 120 minutes, or even less than 90 minutes, as measured from the time point at which all asphalt and rubber granules components have been charged to the system and/or heated to the desired temperature. In some embodiments, a fully integrated rubber-modified asphalt cement composition is prepared by passing and/or circulating a heated mixture of rubber and asphalt through at least one high shear mill for 30-240 minutes (such as greater than 30 minutes and less than 240 minutes), 30-200 minutes, 30-180 minutes, 30-150 minutes, 30-120 minutes, 35-240 minutes, 35-210 minutes, 35-180 minutes, 35-120 minutes, 40-240 minutes, 40-210 minutes, 40-180 minutes, 40-120 minutes, about 45-180 minutes, about 45-120 minutes, about 50-180 minutes about 50-120 minutes, about 60-180 minutes, about 60-150 minutes about 60-120 minutes, as measured from the time point at which all asphalt and rubber granules components have been charged to the system and/or heated to the desired temperature.

In some embodiments, a system and method are provided for high throughput preparation of a fully integrated rubber-modified asphalt cement composition comprising at least 40,000 pounds (such as at least 45,000 pounds, at least 50,000 pounds, at least 52,000 pounds, at least 54,000 pounds, at least 56,000 pounds, at least 58,000 pounds, at least 60,000 pounds, at least 62,000 pounds, at least 64,000 pounds, at least 66,000 pounds, at least 68,000 pounds, at least 70,000 pounds, at least 75,000, at least 80,000 pounds, at least 85,000 pounds, or at least 90,000 pounds) in a period of less than 35 hours (such as less than 30 hours, less than 28 hours, less than 26 hours, less than 24 hours, less than 22 hours, less than 20 hours, less than 18 hours, less than 16 hours, less than 14 hours, or even less than 12 hours), as measured from the time point at which initial charging of the asphalt component begins to the time point at which a fully integrated rubber-modified asphalt cement product comprising all charged asphalt and rubber granule components is produced. In some embodiments, the high throughput system and method comprises contacting asphalt with at least 40,000 pounds of rubber granules, heating the mixture; and passing the heated mixture through at least one high shear mixer. Alternatively, or in addition, the high throughput system or method comprises contacting asphalt with at least 40,000 pounds of rubber granules to form a mixture; heating the mixture to a temperature of at least about 500° F.; and passing the heated mixture through at least one high shear mixer for greater than 30 minutes. Alternatively, or in addition, the high throughput system and method is performed using less than 1.2 million pounds (such as less than 1.0 million pounds; less than 800,000 pounds; less than 600,000 pounds; less than 400,000 pounds; less than 300,000 pounds; less than 200,000 pounds; less than 150,000 pounds; less than 125,000 pounds; or even less than 100,000 pounds) of asphalt.

In one example embodiment, 156,000 pounds of asphalt and 26 super sacks (each containing 2000 pounds) were charged into a system comprising a single high shear mixer, the tire rubber being charged at urate of 45 minutes/super sack. During the time required to charge all of the asphalt and tire rubber components, the already-charged portions of these asphalt and tire rubber components were mixed, heated to 500° F., and circulated through the system. Once charging of the asphalt and tire rubber components into the system was complete, and the complete mixture was heated to the desired temperature, the heated mixture of asphalt and tire rubber was passed (or continued to be passed) through the high shear mixer and the remainder of the system for two hours. From this process, a rubber-modified asphalt cement composition comprising an integration value of at least 98 was produced.

The rubber-modified asphalt cement composition can comprise any desired amount of rubber. For example, the RMAC can comprise greater than about 5 wt. %, such as greater than about 8 wt. %, about 10 wt. %, about 12 wt. %, or even greater than about 14 wt. % of rubber, relative to the total weight of the RMAC, and/or have a rubber content in the range of about 5-15 wt. %, such as about 6-14 wt. %, about 7-13 wt. %, about 7.5-12.5 wt. %, about 8-12 wt. %, about 8.5-12.5 wt. %, or even about 9-11 wt. %, relative to the total weight of the RMAC, as well comprise one or more (including all) of the properties described in this section of the application (for example, rubber content, flash point, softening point, penetration, and/or solubility). In another embodiment, the RMAC can be more concentrated, i.e., having one or more properties (for example, rubber content, flash point, softening point, penetration, and/or solubility) different and/or higher than those desired for the subsequent pre-treatment and/or emulsification steps. For example, the RMAC can comprise greater than about 16 wt. %, about 18 wt. %, about 20 wt. %, about 25 wt. %, about 30 wt. %, or even greater than about 35 wt. % of rubber (relative to the total weight of the RMAC), and/or have a rubber content in the range of about 16-35 wt. %, about 18-30 wt. %, about 20-35 wt. %, or about 20-30 wt. %, relative to the total weight of the RMAC. In this regard, in the event that the RMAC has one or more properties (for example, rubber content, flash point, softening point, penetration, and/or solubility) that are higher than the desired properties for the subsequent pre-treatment and/or emulsification steps, the RMAC can be modified prior to these subsequent steps, such as by blending the RMAC with asphalt. In one embodiment, for example, a RMAC concentrate having greater than about 30 wt. % of rubber, relative to the total weight of the RMAC, is blended (prior to the pre-treatment and emulsification steps) with additional asphalt in a manner such that the RMAC comprises about 5-15 wt. % of rubber, relative to the total weight of the RMAC, as well as one or more (including all) of the properties described in this section of the application (for example, rubber content, flash point, softening point, penetration, and/or solubility).

In one embodiment, the rubber within the RMAC has an average size of less than about 20 microns, such as less than about 18 microns, about 16 microns, about 14 microns, about 12 microns, about 11 microns, about 10 microns, about 9 microns, about 8 microns, about 7 microns, about 6 microns, about 5 microns, about 4 microns, about 3 microns, about 2 microns, about 1 micron, about 0.75 micron, about 0.5 micron, or even less than about 0.1 micron. In another embodiment, greater than about 1% (such as greater than about 3%, about 5%, about 10%, about 15%, or even greater than about 10% by weight) of the rubber in the RMAC has an average size of about 0.1-20 (such as about 1-15, about 5-15, about 5-20, about 10-20, or even about 10-15) microns, with the remainder of the rubber having an average particle size of less than about 10 (such as less than about 8, about 6, or even less than about 4) microns. In another embodiment, the RMAC comprises less than about 8 wt. % (such as less than about 6 wt. %, less than about 5 wt. %, less than about 4 wt. %, less than about 3 wt. %, less than about 2 wt. %, less than about 1 wt. %, less than about 0.5 wt. %, less than about 0.25 wt. %, substantially no, or even no) rubber that is in a solid state.

In one embodiment, the RMAC exhibits a solubility in trichloroethylene (as determined via ASTM D2042) of at least about 90% (such as at least about 92%, at least about 94%, at least about 95%, at least about 96%, at least about 97%, at least about 98%, at least about 98.2%, at least about 98.4%, at least about 98.6%, at least about 98.8%, at least about 99%, at least about 99.2%, at least about 99.4%, at least about 99.6%, or even at least 99.8%). For example, it is preferred, in one embodiment, that when about 3 grams of the RMAC is dissolved in about 100 mL of trichloroethylene and filtered through a 150 mm No. 52 filter paper, less than about 10 wt. % (such as less than about 8 wt. %, about 6 wt. %, about 5 wt. %, about 4 wt. %, about 3 wt. %, about 2 wt. %, about 1.8 wt. %, about 1.6 wt. %, about 1.4 wt. %, about 1.2 wt. %, about 1 wt. %, about 0.8 wt. %, about 0.6 wt. %, about 0.4 wt. %, or even less than about 0.2 wt. %) of the RMAC remains on the filter paper following such filtering.

Alternatively, or in addition, the RMAC exhibits a softening point (as determined via ASTM D36) greater than about 90° F., such as greater than about 100° F., or even greater than about 110° F.—a point at which, for example, a weight (such as a steel ball having a diameter of about 9.5 mm and a mass of about 3.50±0.05 g) penetrates or settles at least about 1 inch into a sample of the RMAC, using a ring and ball softening point apparatus. In one preferred embodiment, the RMAC has a softening point of about 115-125° F.

Alternatively, or in addition, the RMAC comprises a penetration at 77° F. (as determined via ASTM D5) of less than about 60 dmm, such as less than about 50 dmm, about 40 dmm, about 30 dmm, about 20 dmm, or even less than about 10 dmm (such as about 5-50 dmm, about 10-40 dmm, about 15-35 dmm, or even about 15-30 dmm), at which, for example, a 1 mm-diameter needle penetrates into the RMAC at a needle load of about 100 grams for a duration of about 5 seconds.

Alternatively, or in addition, the RMAC comprises a flash point (as determined via ASTM D 93) of at least about 460° F., such as at least about 480° F., at least about 500° F., at least about 510° F., at least about 520° F., at least about 530° F., at least about 540° F., or even at least about 550° F.

In one embodiment, the RMAC is an asphalt cement concentrate having the following properties:

Content Derived from Recycled Tire Rubber = 18-25%
Solubility in Trichloroethylene (ASTM D2042) = 97.5% (min)
Penetration @ 25° C. (ASTM D 5) = 60-90 dmm
Absolute Viscosity @ 60° C. (ASTM D2171) = 1000-1600
Flash Point - Cleveland Open Cup (ASTM D 92) = 450 F. (min)
Softening Point (ASTM D36) = 110-120 F.

In one embodiment, the RMAC comprises about 9-13 wt. % of rubber (relative to the total weight of the RMAC), a penetration at 77° F. (as determined via American Society for Testing and Materials (ASTM) D5) of about 18-22 dmm, a softening point (as determined via ASTM D36) greater than about 112° F., and a solubility in trichloroethylene (as determined via ASTM D2042) of at least about 98%.

In some embodiments, in addition to the rubber and asphalt components, other additives that enhance, cause, and/or assist in devulcanization, liquefaction, and/or breakdown of the rubber are combined, mixed, contacted, and/or blended with the rubber and/or asphalt components prior to and/or during contact of the rubber granules and asphalt in preparing the RMAC. For example, such other additives can aid in incorporation and/or combination of the rubber into the asphalt component, and/or to adjust or alter the physical properties (e.g., softening point, hardness, stability) of the RMAC. For example, any anti-foam agents, polymer latex, and/or sulfonic acids (e.g., DBSA and/or p-TSA) can be used in preparing the RMAC, such as described in U.S. Pat. No. 5,496,400 (Doyle), U.S. Pat. No. 7,087,665 (Sylvester), U.S. Pat. App. No. 2005/0131113, filed Feb. 7, 2005 (Sylvester), and/or U.S. Pat. App. No. 2007/2049762, filed Jul. 10, 2006 (Sylvester). In some preferred embodiments, however, no such other additives are used in preparing the RMAC.

In another embodiment, a system is provided for preparing the RMAC that comprises an asphalt charging device for charging asphalt into the system; a rubber charging device for charging rubber granules into the system; at least one heater for heating the charged asphalt, the charged rubber granules, or a mixture thereof; at least one high shear mixer for mixing the charged asphalt and charged rubber granules into a rubber-modified asphalt cement composition (i.e., for preparing the RMAC from the heated mixture of charged asphalt and charged rubber granules components); and a controller for controlling the asphalt charging device, the rubber charging device, and/or the at least one high shear mixer, in a manner such that the rubber-modified asphalt cement composition has any desired integration factor. Additionally, as is discussed herein, as is illustrated in FIG. 1, and as would be appreciated by those of skill in the art, the system may further comprise any additional components (such as lines, valves, input conduits, output conduit, recycle loops, etc.) needed and/or desired to optimize production of the RMAC and/or to enhance the effectiveness, efficiency, speed, and/or other desirable properties achievable through use of the system. In those embodiments in which the system comprises two or more (e.g., three or more, four or more, or even five or more) high shear mixers, such mixers can be arranged in any desired manner, such as in series, in parallel, or both. It should be noted that the system depicted in FIG. 1 is provided for illustration purposes only, and is in no way intended to be limiting.

The controller used in the present invention can be any controller that is suitable for controlling, coordinating, manipulating, and/or optimizing the operation of one or more components of the system (such as, for example, the asphalt charging device, the rubber charging device, and/or the at least one high shear mixer of the present invention) in a manner such that a rubber-modified asphalt composition having any desired integration factor is produced. In some embodiments, the controller is a semi-automatic controller that allows that any desired degree of user input and/or control during the operation of the system. In some embodiments, the controller is an automatic controller.

The systems and methods described herein are low energy, energy efficient, and low cost systems and methods for the production of rubber-modified asphalt cement compositions, as compared to conventional systems and methods not comprising one or more high shear mixers in combination with the other discussed factors. In particular, for example, use of the present low energy system and/or method to produce a rubber modified asphalt cement composition from 52,000 pounds of rubber granules and having an integration factor of 98, would require at least 5% (such as at least 10%, at least 15%, at least 20%, at least 25%, or even at least 40%) less energy, as compared to the energy required by a conventional system to produce a rubber-modified asphalt cement composition from 52,000 pounds of rubber granules and having an integration factor of 95.

Other End Products

The RMAC can be used alone, or in combination with any other components, to form any desired emulsions, slurry seals, surface sealers, binder compositions, and/or other desired end products for use in any desired application. In one embodiment, for example, a composition comprising the RMAC can be applied to any paved surface, such as any roadway, driving surface, and/or paved surface (such as to form a seal-coat and/or surface sealer) in any suitable manner (such as by computer rate control asphalt spreader truckers, hand spray wands, and/or by squeegees) to form a cured coating. Additionally, a composition comprised the RMAC can be applied to any industrial surface (such as to enhance corrosion resistance of steel, concrete, or the like, and/or to improve fire resistance of such surfaces), any building surface such as any roof surface (such as to form a seal-coat and/or surface sealer for the surface, such as proximate to any asphalt roof surface such as asphalt roof shingles), and/or the like, in any suitable manner. In other embodiments, the composition comprising the RMAC can be form any suitable industrial coating composition, surface sealer composition, roof sealer composition, and/or roofing asphalt cement, or the like. In all of these embodiments, the composition comprising the RMAC can form a cured coating when applied to the target surface.

Such end products comprising the RMAC can be prepared in any suitable manner by combining, mixing, contacting, and/or blending any desired amount of the RMAC with any corresponding amount of other component(s) (e.g., emulsification solution) to produce a composition having any desired properties (such as high and/or enhanced resistance to water, fuel, and/or UV and/or no tackiness, low tackiness, and/or substantially no tackiness properties), as taught, for example, in U.S. Provisional Pat. App. 61/071,473, filed Apr. 30, 2008, the contents of which are incorporated in their entirety herein.

All publications and patent applications mentioned in this specification are herein incorporated by reference to the same extent as if each individual publication or patent application was specifically and individually indicated to be incorporated by reference.

It will be apparent to one of ordinary skill in the art that many changes and modification can be made to the disclosures presented herein without departing from the spirit or scope of the appended claims.

What is claimed is:

1. A method for preparing a rubber-modified asphalt cement composition, comprising:
   i) contacting asphalt with rubber granules to form a mixture;
   ii) heating the mixture to a temperature in the range of 450° F. to 510° F. to form a heated mixture;
   iii) mixing at least a portion of the heated mixture with rubber granules in a pre-wet vessel comprising a mixer to form a heated wetted asphalt/rubber mixture; and
   iv) passing the heated wetted asphalt/rubber mixture through at least one high shear mixer, wherein the rubber-modified asphalt cement composition has an integration value of at least 90.

2. The method of claim 1, wherein the temperature is in the range of 460° F. to 510° F.

3. The method of claim 1, wherein the temperature is in the range of 480° F. to 510° F.

4. The method of claim 1, wherein the temperature is in the range of 490° F. to 510° F.

5. The method of claim 1, wherein the rubber-modified asphalt cement composition has a rubber content in the range of 5-35 wt. % relative to the total weight of the rubber-modified asphalt cement composition.

6. The method of claim 1, wherein the rubber-modified asphalt cement composition has a rubber content in the range of 5-15 wt. % relative to the total weight of the rubber-modified asphalt cement composition.

7. The method of claim 1, wherein the rubber-modified asphalt cement composition has a rubber content of greater than 18 wt. % relative to the total weight of the rubber-modified asphalt cement composition.

8. The method of claim 1, wherein the rubber-modified asphalt cement composition is a rubber-modified asphalt cement concentrate.

9. A system for preparing a rubber-modified asphalt cement composition, comprising:
   i) an asphalt charging device for charging asphalt into the system;
   ii) a rubber charging device for charging rubber granules into the system;
   iii) at least one heater for heating the charged asphalt, the charged rubber granules, or a mixture thereof to a temperature in the range of 450° F. to 510° F.;
   iv) at least one pre-wet vessel comprising a mixer to form a wetted asphalt/rubber mixture from the charged asphalt and charged rubber granules;
   v) at least one high shear mixer for mixing the wetted asphalt/rubber mixture into the rubber-modified asphalt cement composition; and
   vi) a controller for controlling the asphalt charging device, the rubber charging device, and/or the at least one high shear mixer, in a manner such that the rubber-modified asphalt cement composition has an integration value of at least 95.

10. The system of claim 9, wherein the temperature is in the range of 460° F. to 510° F.

11. The system of claim 9, wherein the temperature is in the range of 480° F. to 510° F.

12. The system of claim 9, wherein the temperature is in the range of 490° F. to 510° F.

13. The system of claim 9, wherein the rubber-modified asphalt cement composition comprises 5-15 wt. % rubber.

* * * * *